(12) United States Patent
Perotto

(10) Patent No.: US 7,038,528 B2
(45) Date of Patent: May 2, 2006

(54) HIGH VOLTAGE GENERATOR INCORPORATED IN AN INTEGRATED CIRCUIT

(75) Inventor: Jean-Félix Perotto, Colombier (CH)

(73) Assignee: EM Microelectronic-Marin SA, Marin (CH)

( * ) Notice: Subject to any disclaimer, the term of this patent is extended or adjusted under 35 U.S.C. 154(b) by 54 days.

(21) Appl. No.: 10/490,707

(22) PCT Filed: Sep. 27, 2002

(86) PCT No.: PCT/EP02/11072

§ 371 (c)(1),
(2), (4) Date: Mar. 25, 2004

(87) PCT Pub. No.: WO03/030343

PCT Pub. Date: Apr. 10, 2003

(65) Prior Publication Data

US 2004/0239407 A1 Dec. 2, 2004

(30) Foreign Application Priority Data

Sep. 27, 2001 (FR) .................................. 01 12436

(51) Int. Cl.
*G05F 1/10* (2006.01)
(52) U.S. Cl. .................. 327/536; 327/566; 363/59; 363/60

(58) Field of Classification Search ............ 363/59–61; 327/346, 361, 536–543
See application file for complete search history.

(56) References Cited

U.S. PATENT DOCUMENTS 3,684,982 A * 8/1972 Charbonnier ........... 331/177 V (Continued)

FOREIGN PATENT DOCUMENTS

EP 0 292 269 A2 11/1988
EP 0 485 016 A2 5/1992

OTHER PUBLICATIONS

A. Rusznyak, Technology Time Capsule, "One-Pin Oscillators and Voltage Multipliers," Circuits & Devices, Sep. 1998, pp. 52-54.

(Continued)

*Primary Examiner*—Rajnikant B. Patel
(74) *Attorney, Agent, or Firm*—Griffin & Sziol, P.C.

(57) ABSTRACT

A high voltage generator (GHT) incorporated in an integrated circuit (IC) and comprising a charge pump (1) whose input voltage is the supply voltage ($V_{DD}$) of the integrated circuit (IC) and which is clocked by direct clock signals (Φ) and complemented clock signals ($\overline{\Phi}$), characterized in that it comprises means (5) for re-injecting a fraction ($V_{IN}$) of the voltage from said charge pump ($V_{HV}$) into the input (6) to which said supply voltage ($V_{DD}$) is applied.

7 Claims, 1 Drawing Sheet

U.S. PATENT DOCUMENTS 5,394,320 A    2/1995   Blodgett
5,600,551 A    2/1997   Luscher, Jr.
5,982,223 A  * 11/1999  Park et al. .................. 327/536

OTHER PUBLICATIONS

J. Dickson, "On-Chip High-Voltage Generation in MNOS Integrated Circuits Using an Improved Voltage Multiplier Technique," IEEE Journal of Solid-State Circuits, vol. SC-11, No. 3, Jun. 1976, pp. 374-378.

International Search Report for PCT/EP02/11072, completed Apr. 1, 2003, at Rijswijk, by S. Thisse, and mailed Sep. 4, 2003.

Preliminary International Examination Report for PCT/EP02/11072, completed in Munich by A. Roider on Apr. 10, 2003, and mailed Jul. 18, 2003 (in French).

* cited by examiner

HIGH VOLTAGE GENERATOR INCORPORATED IN AN INTEGRATED CIRCUIT

FIELD OF THE INVENTION

This is a National Phase Application in the United States of International Patent Application No. PCT/EP 02/11072, filed Sep. 27, 2002, which claims priority on French Patent Application No. 0112436, filed Sep. 27, 2001. The entire disclosures of the above patent applications are hereby incorporated by reference.

The present invention relates to a high voltage generator incorporated in an integrated circuit.

The invention relates more particularly to a high voltage generator for reading and writing data in an EEPROM.

BACKGROUND OF THE INVENTION

High voltage generators of the above type, also known as charge pumps, generally comprise a series of voltage multipliers consisting of capacitors and diodes (or transistors connected as diodes) that multiply by a given factor an input voltage that is typically the supply voltage of the integrated circuit. A high voltage generator of the above kind is described in a paper by J. F. Dickson published on 3 Jun. 1976 in IEEE Journal Of Solid State Circuits, Vol. SC. 11, No.3, pages 374–378, entitled "On-chip high voltage generation in NMOS integrated circuits using an improved voltage multiplier circuit", for example. The disclosure of that paper is hereby incorporated by reference into the present description.

Thus if the charge pump comprises 14 stages, for example, it is possible to generate a voltage up to ten times a given supply voltage, for example 2 volts, at the input of the charge pump.

However, this kind of high voltage generator has a number of drawbacks, as it requires a relatively large circuit structure, for which space must be reserved on the integrated circuit.

Moreover, integrating this kind of integrated circuit into portable objects such as telephones, cards or even laptop computers does not lead to optimum battery life conditions in respect of the requirements of the object itself. One major concern in this field is reducing power consumption and using the lowest possible circuit supply voltage, in particular to extend the service life of the power supply means.

An object of the present invention is to alleviate the drawbacks of the prior art referred to above and in particular to provide a high voltage generator of the generic type indicated that either generates a high voltage using a charge pump comprising a much smaller number of multiplier stages than was necessary in the prior art or reduces power consumption by using a lower circuit supply voltage.

SUMMARY OF THE INVENTION

Thus the invention consists in a high voltage generator incorporated in an integrated circuit and comprising a charge pump whose input voltage is the supply voltage of the integrated circuit and which is clocked by direct clock signals and complemented clock signals, characterised in that it comprises means for re-injecting a fraction of the voltage from said charge pump at the input to which said supply voltage is applied.

Thanks to these features, and compared to prior art high voltage generators, it is possible either to obtain a high voltage at the output of the generator with a small number of multiplier stages or to apply a much lower voltage to the input of the charge pump to obtain a comparable high voltage.

The generator according to the invention may also have one or more of the following features:

said re-injection means comprise an adiabatic reducer;
the re-injection coefficient of said re-injection means is in the range from 0 to 1;
the re-injection coefficient is equal to 0.5;
said adiabatic reducer comprises two capacitors and switching means for connecting said capacitors alternately in series to said voltage from the charge pump and in parallel to supply said voltage fraction;
said capacitors have the same capacitance;
the working frequency of said charge pump is equal to the clock frequency of said switching means.

The invention further consists in an integrated circuit comprising a high voltage generator as defined hereinabove and characterised in that it comprises an EEPROM supplied by said high voltage generator.

BRIEF DESCRIPTION OF THE DRAWINGS

Other features and advantages of the present invention will become apparent in the course of the following description, which is given by way of example only and with reference to the appended drawings, in which.

DETAILED DESCRIPTION OF THE ILLUSTRATIVE EMBODIMENTS

Figure 1:
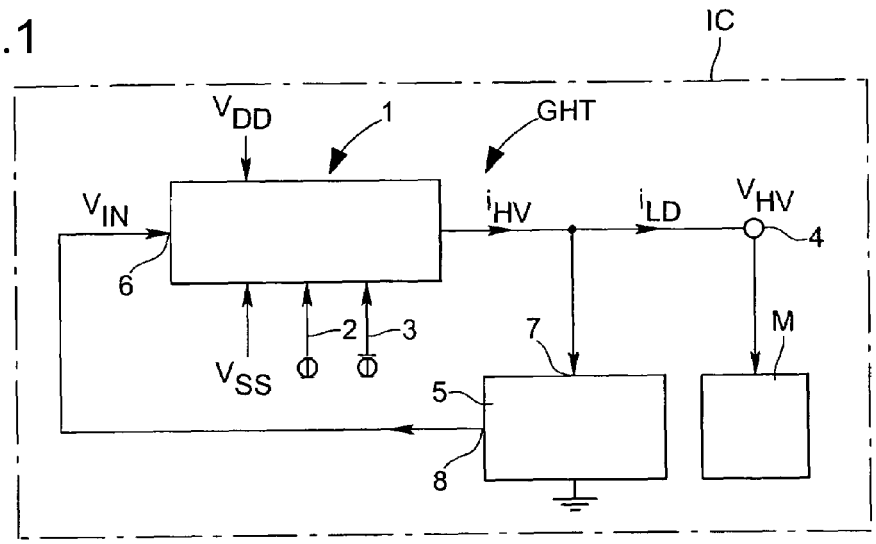
FIG. 1 is a simplified block diagram of a high voltage generator according to the invention.

FIG. 1 is a simplified block diagram of a high-tension generator GHT according to the invention. It is incorporated into an integrated circuit IC and, in this example, supplies power to an EEPROM. Of course, the integrated circuit IC may include other functional units that are not shown.

The high voltage generator GHT comprises a voltage multiplier unit 1 formed of a charge pump that is known in the art and the operation of which is clocked by two-phase clock signals, namely a direct signal D and a complemented signal D, which are applied to terminals 2 and 3, respectively, of the unit 1. These clock signals may be derived from a main clock (not shown) of the integrated circuit IC, for example. Note that the clock signals used may equally be non-interlaced four-phase signals.

The multiplier unit 1 receives the voltages $V_{DD}$ and $V_{SS}$ of the integrated circuit IC. It has an output terminal 4 at which the required high voltage $V_{HV}$ is available. The multiplier unit 1 may comprise n multiplier stages, the number of stages being selected as a function of the required output voltage $V_{HV}$. The multiplier unit may be of any type known in the art, for example that depicted in FIG. 5 of the paper previously cited.

According to the invention, the high voltage generator also comprises means 5 for re-injecting a fraction $V_{in}$ of its output voltage at an input terminal 6 of the unit 1. If the unit 1 is based on the circuit depicted in FIG. 5 of the paper previously cited, the terminal 6 may be connected to the line of that circuit to which the voltage $V_{DD}$ is applied.

In the embodiment shown, the re-injection means 5 take the form of an adiabatic reducer, the term "adiabatic" in the present context meaning that the reducer does not dissipate energy. In other words, the product of its input voltage by its input current is equal to the product of its output voltage by its output current.

The adiabatic reducer 5 has an input terminal 7 to which is applied the output voltage $V_{HV}$ available at the output terminal 4. It also has an output terminal 8 at which appears the voltage $V_{in}$ that is applied to the input terminal 6 of the multiplier unit 1.

The adiabatic reducer has a reduction coefficient ρ such that the high open circuit voltage $V_{HV}$ produced at the output of the generator is defined by the equation:

$$V_{HV} = \frac{V_{HV0}}{1-\rho}$$

in which $V_{HV0}$ represents the high open circuit voltage of the multiplier unit 1 in the absence of the adiabatic reducer 5 and the coefficient ρ may be from 0 to 1. Under these conditions, the voltage $V_{HV}$ could, at least theoretically, be from $V_{HV0}$ to ∞. However, the maximum output voltage that can be obtained is obviously limited by construction contingencies of the integrated circuit IC and in particular by the breakdown voltages of its components.

Figure 2:
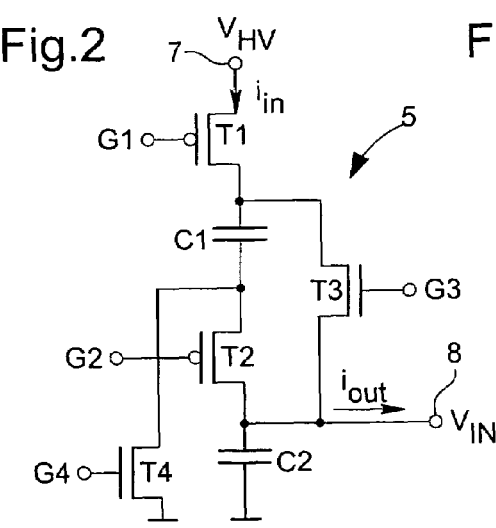
FIG. 2 is a theoretical circuit diagram of an adiabatic reducer used in the high voltage generator according to the invention.

FIG. 2 is a theoretical circuit diagram of an adiabatic reducer that may be used in the high voltage generator GHT according to the invention. This reducer is based on the switched capacitor principle. It comprises a series circuit comprising, from the input terminal 7 to ground, the drain-source path of a transistor T1, a first capacitor C1, the drain-source path of a transistor T2, and a second capacitor C2. The drain-source path of a third transistor T3 is connected between the node common to the transistor T1 and the capacitor C1 and the node common to the transistor T2 and the capacitor C2. The node common to the third transistor T3 and the capacitor C2 forms the output terminal 8 of the adiabatic reducer. The node common to the capacitor C1 and the transistor T2 is grounded via the drain-source path of a transistor T4.

The reduction coefficient ρ is fixed by the chosen circuit, in particular as a function of the number of switched capacitors and their respective capacitance values. It is preferably made equal to 0.5, as in the situation of two capacitors of equal capacitance, it being understood that a circuit using this value is convenient to implement and confers a high overall multiplication coefficient on the high voltage generator.

The transistors T1 to T4 form switching means and their gates are driven by respective clock signals G1 to G4 whose duration and distribution in time are chosen to achieve the following mode of operation. In a first phase the two capacitors C1 and C2 are charged in series by the input voltage $V_{HV}$ and in a second phase the two capacitors are connected in parallel to produce the output voltage $V_{IN}$ of the reducer 5, which is half the voltage $V_{HV}$, so that ρ=0.5. The two phases are repeated periodically and the repetition frequency may be equal to the pumping frequency of the multiplier unit 1 (for example a few hundreds of kHz).

Figure 3:
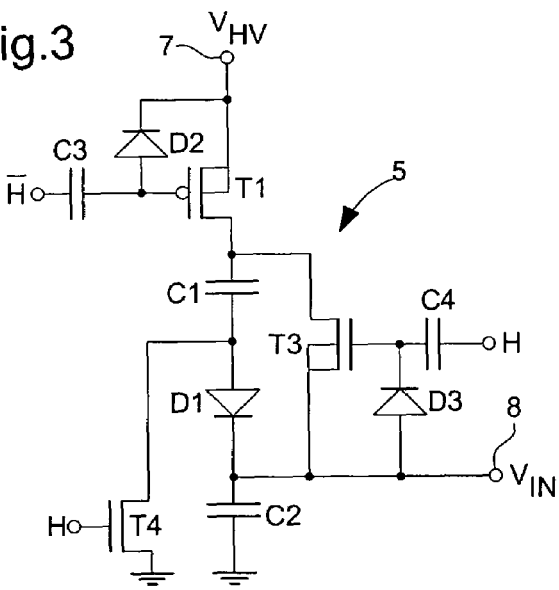
FIG. 3 is a theoretical circuit diagram of a variant of the adiabatic reducer.

FIG. 3 shows a variant of the adiabatic reducer 5. This circuit comprises the transistors T1, T3 and T4 from the FIG. 2 theoretical circuit diagram connected to the capacitors C1 and C2 in the same way. The transistor T2 is preferably replaced by a diode D1 if the circuit technology allows the use of floating diodes (for example polysilicon diodes).

The drain and the gate of the transistor T1 are connected together via a diode D2, and a capacitor C3 is connected to the gate of the transistor T1 in order to apply to it a complemented clock signal $\overline{H}$, the direct version H of which is received by the gate of the transistor T4 and the gate of the transistor T3, the clock signal being applied in this case via a capacitor C4. A diode D3 connects this gate to the terminal 8.

In the FIG. 3 embodiment, the function of the diodes D2 and D3 is to bias the respective transistors T1 and T3 so that they are turned off when the clock pulses are absent.

The high voltage generator according to the invention uses fewer multiplier stages in the charge pump 1 to obtain a high voltage from a given supply voltage than would be required in a high voltage generator with no re-injection means 5. For example, a charge pump with fourteen stages could multiply the open circuit voltage of 2 V to approximately 20 V, whereas with the high voltage generator according to the invention, in which the coefficient ρ=0.5, just seven booster stages in the charge pump 1 suffice.

Conversely, if the high voltage generator according to the invention comprises the same number of multiplier stages in the charge pump 1 as a prior art embodiment, it is possible to obtain a high voltage comparable to that obtained in the prior art embodiment from a lower supply voltage. In the above example, and considering the same open circuit voltage, the same output high voltage of 20 V may be obtained with a supply voltage of only approximately 1.5 V. Obviously this may be very important in applications where only a low supply voltage is available (as in electronic timepieces, for example).

Figure 4:
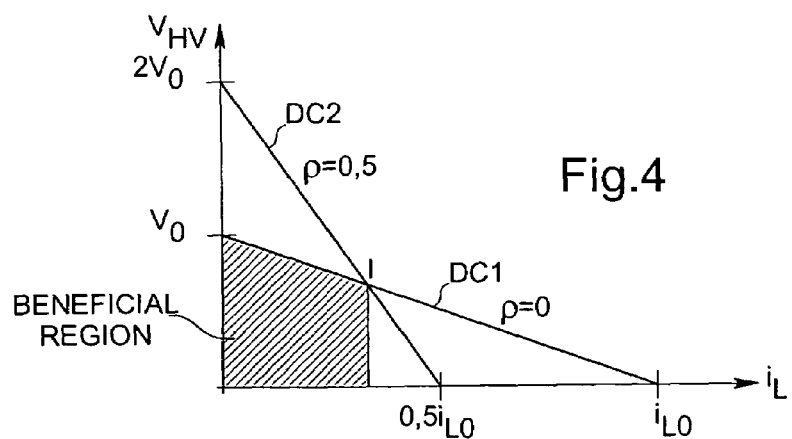
FIG. 4 is an explanatory diagram showing the output voltage of the generator as a function of its output current, the diagram comprising in particular two straight load lines.

FIG. 4 is a graph showing the operation of the high voltage generator according to the invention with the output high voltage $V_{HV}$ plotted on the ordinate axis and the load current $i_{LO}$ plotted on the abscissa axis. The figure shows a first straight load line DC1 of the charge pump of the unit 1 in the absence of re-injection (ρ=0) and a straight load line DC2 for the situation with re-injection (ρ=0.5).

Note that the open circuit high voltage, i.e. the voltage in the absence of a load current ($i_{LO}$=0), is $V_0$ without re-injection and $2V_0$ with re-injection.

Similarly, the short circuit current halved, which corresponds to quadrupling the internal resistance.

A beneficial region of the generator may be defined as the cross-hatched region corresponding to an output voltage of the generator with a reduction coefficient of 0.5 that is higher than the output voltage of the multiplier with a zero reduction coefficient. This region is delimited by the intersection point 1. For a given working frequency, the beneficial region covers currents less than 20% of the short-circuit current, defined as the current supplied by the generator if the output is grounded. It is nevertheless possible to increase the current range in this region by increasing the frequency of the clock signals, as the two are related.

Note that the description refers to the use of MOS transistors, in particular for implementing the adiabatic reducer, but that producing a similar reducer with bipolar transistors may be envisaged.

It is to be understood that the description is given by way of example only and that other embodiments, in particular of the adiabatic reducer, may fall within the scope of the present invention.

The invention claimed is:

1. A high voltage generator incorporated in an integrated circuit and comprising a charge pump whose input voltage is a supply voltage of the integrated circuit and which is clocked by direct clock signals and complemented clock signals, further comprising means for re-injecting a fraction of a voltage from said charge pump at the input to which said supply voltage is applied, wherein said re-injection means comprise an adiabatic reducer.

2. The generator according to claim 1, wherein the re-injection coefficient of said re-injection means is in the range from 0 to 1.

3. The generator according to claim 2, wherein the re-injection coefficient is equal to 0.5.

4. The generator according to claim 1, wherein said adiabatic reducer comprises two capacitors and switching means for connecting said capacitors alternately in series to said voltage from the charge pump and in parallel to supply said voltage fraction.

5. The generator according to claim 4, wherein said capacitors have the same capacitance.

6. The generator according to claim 4, wherein the working frequency of said charge pump is equal to the clock frequency of said switching means.

7. An integrated circuit comprising a high voltage generator according to claim 1, wherein the integrated circuit further comprises an EEPROM powered by said high voltage generator.

* * * * *